US011526625B2

United States Patent
Raju et al.

(10) Patent No.: US 11,526,625 B2
(45) Date of Patent: Dec. 13, 2022

(54) SYSTEMS FOR SANITIZING PRODUCTION DATA FOR USE IN TESTING AND DEVELOPMENT ENVIRONMENTS

(71) Applicant: BANK OF AMERICA CORPORATION, Charlotte, NC (US)

(72) Inventors: Sujata Devon Raju, Frisco, TX (US); Vinod Kumar Alladi, Hyderabad (IN); Bhimeswar Rao Kharade Maratha, Charlotte, NC (US); Parthiban Tiruvayur Shanmugam, Charlotte, NC (US); Durga Prasad Turaga, Murphy, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 539 days.

(21) Appl. No.: 16/665,157

(22) Filed: Oct. 28, 2019

(65) Prior Publication Data
US 2021/0124842 A1    Apr. 29, 2021

(51) Int. Cl.
| G06F 21/62 | (2013.01) |
| G06F 11/36 | (2006.01) |
| G06F 40/30 | (2020.01) |
| G06V 30/413 | (2022.01) |

(52) U.S. Cl.
CPC ...... *G06F 21/6254* (2013.01); *G06F 11/3688* (2013.01); *G06F 21/6227* (2013.01); *G06F 40/30* (2020.01); *G06V 30/413* (2022.01)

(58) Field of Classification Search
CPC ............ G06F 21/6254; G06F 11/3688; G06F 21/6227; G06F 40/30; G06F 11/3664; G06F 21/6218; G06F 2221/2143; G06F 40/279; G06F 40/166; G06V 30/413
See application file for complete search history.

(56) References Cited

U.S. PATENT DOCUMENTS

| 7,509,684 | B2 * | 3/2009 | McDonald | G06F 21/6254 |
| | | | | 707/999.009 |
| 9,846,716 | B1 * | 12/2017 | Scott | G06F 21/6254 |
| 10,210,073 | B1 * | 2/2019 | Baruch | G06F 16/128 |
| 2005/0283667 | A1 * | 12/2005 | Batten | G06F 11/3672 |
| | | | | 714/25 |
| 2017/0220458 | A1 * | 8/2017 | Finger | G06F 11/3688 |
| 2018/0210817 | A1 * | 7/2018 | Kelly | G06F 16/252 |
| 2020/0322361 | A1 * | 10/2020 | Ravindra | G06F 16/335 |
| 2021/0004485 | A1 * | 1/2021 | Summers | G06F 40/284 |

* cited by examiner

*Primary Examiner* — Daxin Wu
(74) *Attorney, Agent, or Firm* — Moore & Van Allen PLLC; James C. Edwards (57) ABSTRACT

An online data hub/portal that provides for data to be extracted from production environments, sanitized (removal of non-public information NPI) and loaded into non-production environment (e.g., testing and development environment). The online data hub/portal allows users to extract data from a disparate production applications into a first secure staging location that triggers identification of Non-Public Information (NPI), sanitization of the identified NPI and validation of the data (e.g., verifying that NPI has been identified and sanitized and that all relationships between data elements in downstream and upstream applications are kept intact). Once sanitized and validated, the data hub places the data in a second secure staging location that provides for loading the sanitized data into the non-production environment.

19 Claims, 4 Drawing Sheets

SYSTEMS FOR SANITIZING PRODUCTION DATA FOR USE IN TESTING AND DEVELOPMENT ENVIRONMENTS

FIELD OF THE INVENTION

The present invention is generally related to data processing and, more specifically, a data hub/portal for extracting data from production applications and sanitizing the data for use in non-production applications (i.e., test and development applications).

BACKGROUND

Many entities employ numerous software applications in the course of conducting the affairs of the entity. Typically, before a software application is elevated to an actual working status (otherwise referred to as "production" status or mode) or before revisions to production software applications are executed, a development and/or testing phase (i.e., "non-production" phase) is implemented to insure that the software application functions as designed once it enters the production phase.

In order to create a realistic testing and development environment that mirrors the production environment, testing and development applications rely on production data. However, production data may include Non-Public Information (NPI), such as actual names, addresses, account number, or other information of a personal nature and the entities may require (or be required by government regulations) that none of the NPI is exposed within the testing and development applications. Therefore, once data is imported from production application, the data must be sanitized by removing the NPI and replacing it with fictitious values. For example, names, addresses, account numbers or the like must be converted to fake/fictitious names, addresses, account numbers or the like. Conventionally, sanitization of data, otherwise referred to as "scrubbing the data" is a mostly manual process, in which numerous individuals are tasked with identifying the NPI in imported production data and converting the identified NPI to fictitious values. Such manual process is not only inefficient but is highly prone to error.

Moreover, in large entities a high volume of testing and developments applications may be deployed. Since many of the testing and development applications are integrated, the data that is loaded to these applications needs to occur simultaneously to insure that each application has the same test data. A transaction from a top of the chain testing application may subsequently flow through a plurality of different lower level testing application and, if the data in the application is not in synch, the testing will fail (i.e., test code/software will not be promoted to production code/software).

Therefore, a need exists to develop systems, methods, computer programs and the like that address the aforementioned problems. Specifically, the desired systems, methods, computer programs and the like provide an end-to-end solution for importing data from production applications, automatically identifying NPI in the production data, sanitizing the NPI and staging the sanitized production data for subsequent loading/seeding of data to the testing and development applications. Moreover, the desired systems, methods, computer program products and the like should insure that data that is loaded/seeded into the plurality of non-production applications occurs in a synchronized fashion, such that, each application, at a give point in time, has the same data.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by presenting systems, methods, computer program product and/or the like that provide for an online data hub/portal that allows for users to perform on-demand and/or scheduled extraction of data from disparate production applications into a secure staging location that triggers identification of Non-Public Information (NPI), sanitization of the identified NPI and validation of the data. Validation of the data not only insures that the NPI has been identified and sanitized but also that all relationships between data elements in downstream and upstream applications are kept intact. Once sanitized and validated, the data hub/portal places the data in a second secure staging location from which the sanitized data is loaded, otherwise referred to as "seeding", into the non-production environment (e.g., testing and development applications or the like).

As such, the present invention provides an efficient means by which data can be extracted from production environments and loaded into non-production environments. In addition, perils related to NPI being exposed in the non-production environment are mitigated by the automated manner in which NPI is identified, sanitized and, subsequently validated. Moreover, the data hub provides for reporting and metric tracking capabilities, as well as, logging and audit trails to insure compliance with internal and/or external (e.g., government) regulations and standards.

A system extracting and sanitizing production data for testing and development environments defines first embodiments of the invention. The system includes a plurality of production applications configured to process production data that comprises data elements including non-public information and a plurality of non-production applications configured for testing and/or developing the application's code prior to potential release as one of the plurality of production applications. The system further includes a computing platform in public network communication (e.g., Internet or the like) with the production and non-production applications. The computing platform includes a memory and at least one processor in communication with the memory. The memory stores instructions that are executable by the at least one processor. The instructions are configured to receive a first user request for a copy job. The first user request includes first parameters defining one or more occurrence of the copy job (i.e., copying user-specified production data from at least one of the production applications). The instructions are further configured to, in response to receiving the user request, execute the copy job to capture the production data from the at least one of the production applications and copy the captured production data to a first secure staging location.

The instructions are further configured to (i) identify, from within the data elements of the production data, the non-public information, and (ii) sanitize the user-specified production data by replacing the identified non-public information with fictitious information. In response to sanitizing the data, the instructions are further configured to copy the sanitized data to a second secure staging location and receive a second user request for a load job. The second user request includes second parameters defining one or more occurrences of loading the sanitized data from the second secure staging location to a plurality of the non-production applications. The instructions are further configured to load the sanitized data from the second secure staging location to the plurality of the non-production applications.

In specific embodiments of the system, the instructions are further configured to, in response to sanitizing the user-specified production data, validate that the data elements of production elements that included the non-public information have replaced the non-public information with the fictitious information. In such embodiments of the system, the instructions configured to validate include instructions for insuring that upstream and/or downstream relationships between date elements are maintained after the identified non-public information has been replaced with the fictitious information.

In further specific embodiments of the system, the instructions configured to receive the first user request for the copy job are further configured to receive the first user request for the copy job including the first parameters that define a plurality of scheduled occurrences of copying the user-specified production data from the at least one of the production applications. In such embodiments of the system, the instructions configured to execute the copy job are further configured to execute the copy job in accordance with the plurality of scheduled occurrences of copying the user-specified production data from the at least one of the production applications.

In still further specific embodiments of the system, the instructions configured to copy the sanitized data to the second secure staging location further include instructions configured to maintain a copy of the sanitized data at the second secure staging location after loading the sanitized data to the plurality of the non-production applications.

In additional specific embodiments of the system, the instructions are further configured to, in response to receiving the first user request, verify that a user submitting the user request has authorized access to the at least one of the production applications. While in other specific embodiments of the system the instructions are further configured to, in response to copying the sanitized data to the second secure staging location, communicate an electronic notification to a user that notifies the user that the sanitized data is available for requesting second copy jobs.

Moreover, in further specific embodiments of the system the instructions are further configured to monitor progress and completion of the instructions including of at least one of (i) the copy job, (ii) the identification of the non-public identification in the production data, (iii) the sanitization of the production data, and (iv) the load job. While in other specific embodiments of the system, the instructions are further configured to log and store actions performed by the instructions including (i) the copy job, (ii) the identification of the non-public identification in the production data, (iii) the sanitization of the production data, and (iv) the load job.

A computer-implemented method for extracting and sanitizing production for testing and development environments defines second embodiments of the invention. The method is implemented by one or more processing devices. The method includes receiving a first user request for a copy job. The first user request includes first parameters defining one or more occurrence of the copy job (i.e., copying user-specified production data from at least one of the production applications). The method further includes, in response to receiving the user request, executing the copy job to capture the production data from the at least one of the production applications and copy the captured production data to a first secure staging location. In addition the method includes (i) identifying, from within the data elements of the production data, the non-public information, and (ii) sanitizing the user-specified production data by replacing the identified non-public information with fictitious information. Further, the method includes copying the sanitized data to a second secure staging location and receiving a second user request for a load job. The second user request includes second parameters defining one or more occurrences of the load job (i.e., loading the sanitized data from the second secure staging location to a plurality of the non-production applications). In addition, the method includes loading the sanitized data from the second secure staging location to the plurality of the non-production applications.

In specific embodiments the computer-implemented method further includes, in response to sanitizing the user-specified production data, validating that the data elements of production elements that included the non-public information have replaced the non-public information with the fictitious information. In such embodiments of the method, validating includes insuring that relationships between date elements are maintained after the identified non-public information has been replaced with the fictitious information.

In other specific embodiments of the computer-implemented method, receiving the first user request for the copy job further includes receiving the first user request for the copy job including the first parameters that define a plurality of scheduled occurrences of copying the user-specified production data from the at least one of the production applications. In such embodiments of the method executing the copy job further includes executing the copy job in accordance with the plurality of scheduled occurrences of copying the user-specified production data from the at least one of the production applications.

In still further specific embodiments, the method further includes maintaining a copy of the sanitized data at the second secure staging location after loading the sanitized data to the plurality of the non-production applications. In still other specific embodiments the method includes, in response to receiving the first user request, verifying that a user submitting the user request has authorized access to the at least one of the production applications.

In additional embodiments, the method includes, in response to copying the sanitized data to the second secure staging location, communicating an electronic notification to a user that notifies the user that the sanitized data is available for requesting second copy jobs.

A computer program product including a non-transitory computer-readable medium defines third embodiments of the invention. The computer-readable medium includes a first set of codes for causing a computer to receive a first user request for a copy job. The first user request includes first parameters defining one or more occurrence of the copy job (i.e., copying user-specified production data from at least one of the production applications). The computer-readable medium includes a second set of codes for causing a computer to, in response to the user request, execute the copy job to capture the production data from the at least one of the production applications and copy the captured production data to a first secure staging location. Further, the computer-readable medium includes a third set of codes for causing a computer to (i) identify, at the first secure staging location, from within the data elements of the production data, the non-public information, and (ii) sanitize the user-specified production data by replacing the identified non-public information with fictitious information.

Additionally, the computer-readable medium includes a fourth set of codes for causing a computer to copy the sanitized data to a second secure staging location, and a fifth set of codes for causing a computer to receive a second user request for a load job. The second user request includes second parameters defining one or more occurrences of loading the sanitized data from the second secure staging location to a plurality of the non-production applications. Moreover, the computer-readable medium includes a sixth set of codes for causing a computer to load the sanitized data from the second secure staging location to the plurality of the non-production applications.

In specific embodiments of the computer program product the computer-readable medium includes a seventh set of codes for causing a computer to. in response to sanitizing the user-specified production data, validate that the data elements of production elements that included the non-public information have replaced the non-public information with the fictitious information. In such embodiment, validating includes insuring that relationships between date elements are maintained after the identified non-public information has been replaced with the fictitious information.

In further specific embodiments of the computer program product, the first set of codes is further causes the computer to receive the first user request for the copy job including the first parameters that define a plurality of scheduled occurrences of copying the user-specified production data from the at least one of the production applications, and the second set of codes further causes the computer to execute the copy job in accordance with the plurality of scheduled occurrences of copying the user-specified production data from the at least one of the production applications.

Moreover, in additional embodiments of the computer program product. The computer-readable medium includes a seventh set of codes for causing a computer to maintain a copy of the sanitized data at the second secure staging location after simultaneously loading the sanitized data to the plurality of the non-production applications.

Thus, according to embodiments of the invention, which will be discussed in greater detail below, an online data hub/portal is described that provides for data to be extracted from production environments and loaded into non-production environment (e.g., testing and development environment) while undergoing sanitization of non-public information from the data. The online data hub/portal allows users to extract data from a disparate production applications into a first secure staging location that triggers identification of Non-Public Information (NPI), sanitization of the identified NPI and validation of the data (e.g., verifying that NPI has been identified and sanitized and that all relationships between data elements in downstream and upstream applications are kept intact). Once sanitized and validated, the data hub places the data in a second secure staging location that provides for loading the sanitized data into the non-production environment.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the disclosure in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a timedependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, as described below in relation the figures, embodiments of the present invention provide for an online data hub/portal that allows for users to perform on-demand and/or scheduled extraction of data from disparate production applications into a secure staging location that triggers identification of Non-Public Information (NPI), sanitization of the identified NPI and validation of the data. Validation of the data not only insures that the NPI has been identified and sanitized but also that all relationships between data elements in downstream and upstream applications are kept intact. Once sanitized and validated, the data hub/portal places the data in a second secure staging location from which the sanitized data is loaded, otherwise referred to as "seeding", into the non-production environment (e.g., disparate testing and development applications or the like).

As such, the present invention provides an efficient means by which data can be extracted from production environments and loaded into non-production environments. In addition, perils related to NPI being exposed in the non-production environment are mitigated by the automated manner in which NPI is identified, sanitized and, subsequently validated. Moreover, the data hub provides for reporting and metric tracking capabilities, as well as, logging and audit trails to insure compliance with internal and/or external (e.g., government) regulations and standards.

Figure 1:
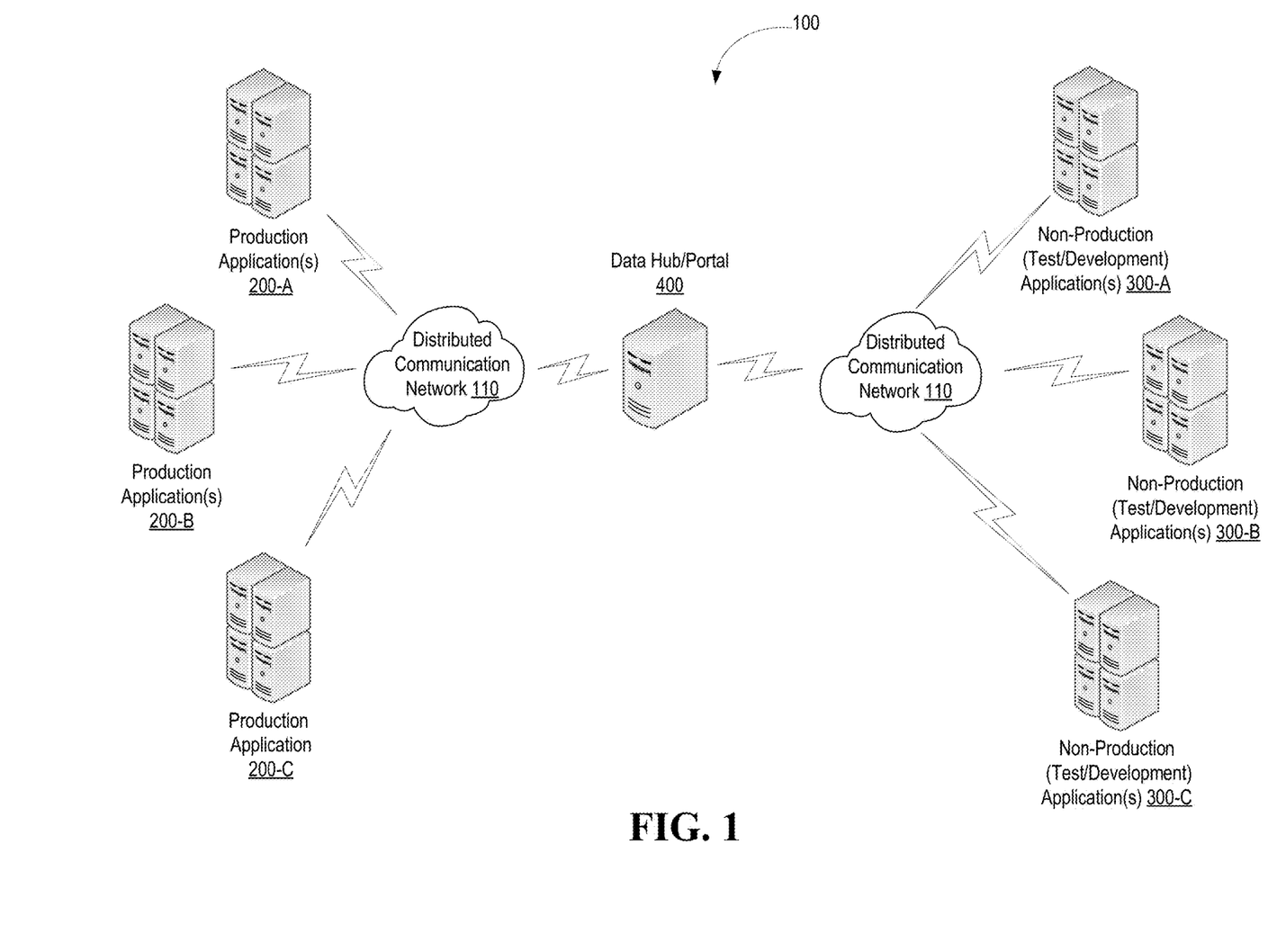
FIG. 1 is a schematic diagram of a system for extracting data from production applications, sanitizing the data in a secure environment and loading the data into a testing and development environment, in accordance with embodiments of the present invention.

Turning now to the figures, FIG. 1 a schematic diagram is provided of an exemplary system 100 for sanitizing data extracted from a production environment before loading/seeding the data into a non-production environment, in accordance with embodiments of the present invention. The system comprises a plurality of disparate production applications 200-A, 200-B, 200-C, executed, as shown, on application servers or the like. The disparate nature of the production applications 200-A, 200-B, 200-C may be configured to execute on any known or future known operating system, as well as, known or future known computing apparatus/devices. The production applications are configured to process production data that includes data elements. In accordance with embodiments of the present invention some of the data elements consist of Non-Public Information (NPI), such as names, addresses, telephone numbers, account numbers or the like. NPI as used herein includes any information/data that an entity views as confidential for purposes of public dissemination.

System 100 additionally includes a plurality of disparate non-production (e.g., test and/or development) applications 300-A, 300-B, 300-C, executed, as shown, on applications servers or the like. The non-production applications 300-A, 300-B, 300-C may include any application that is not a production application. In specific embodiments of the invention, the non-production applications including testing and/or development applications configured for testing and/or developing new or revised code/software prior to potential release as a production application.

The system 100 additionally includes a data hub/portal 400, executed as shown, on one or more servers or, in other embodiments, other computing devices. The data hub portal is in network connection with the production applications 200-A, 200-B, 200-C and the non-production applications 300-A, 300-B, 300-C via distributed communication network 110. In specific embodiments of the invention, in which the data hub/portal is an online hub/portal, the distributed communication network 110 may include a public communication network, such as the Internet or the like. The data hub/portal 400 is accessible to users who desire to extract data from production application 200-A, 200-B, 200-C for use in non-production applications 300-A, 300-B, 300-C. In this regard, the data hub/portal 400 is configured to receive requests from users for copy jobs. The requests include parameters that define the criteria of the user-specified data to be extracted as well as indicating if the copy job is a one-time only occurrence or a regularly scheduled occurrence (e.g., daily, weekly or the like). In response to receiving the user input, the data hub/portal is configured to execute the copy job to capture the requested production data from at least one, and typically more of the production applications 200-A, 200-B, 200-C and copy the captured production data to a first secure staging area.

At the first secure staging area, the data hub/portal 400 is configured to identify the NPI and sanitize the production data by replacing the identified NPI with fake/fictitious information. In specific embodiments of the invention, once sanitized the data is subject to validation to insure that all of the NPI has been identified and sanitized and that all upstream and downstream application relationships between data elements that have been sanitized remain intact. Once the data has been sanitized, the data is copied to a second secure staging location.

Once the data has been copied to the second secure staging area, the data hub/portal 400 may be configured to notify applicable users that the data is available and ready for loading/seeding into the non-production environment. In this regard, once the data is available in the, the data hub/portal is configured to receive requests from users for a load/seed jobs. The requests include parameters that define the which applications the data should be loaded to, as well as indicating whether the load job is a one-time only occurrence or is configured to occur on regularly scheduled basis (e.g., daily, weekly or the like).

Figure 2:
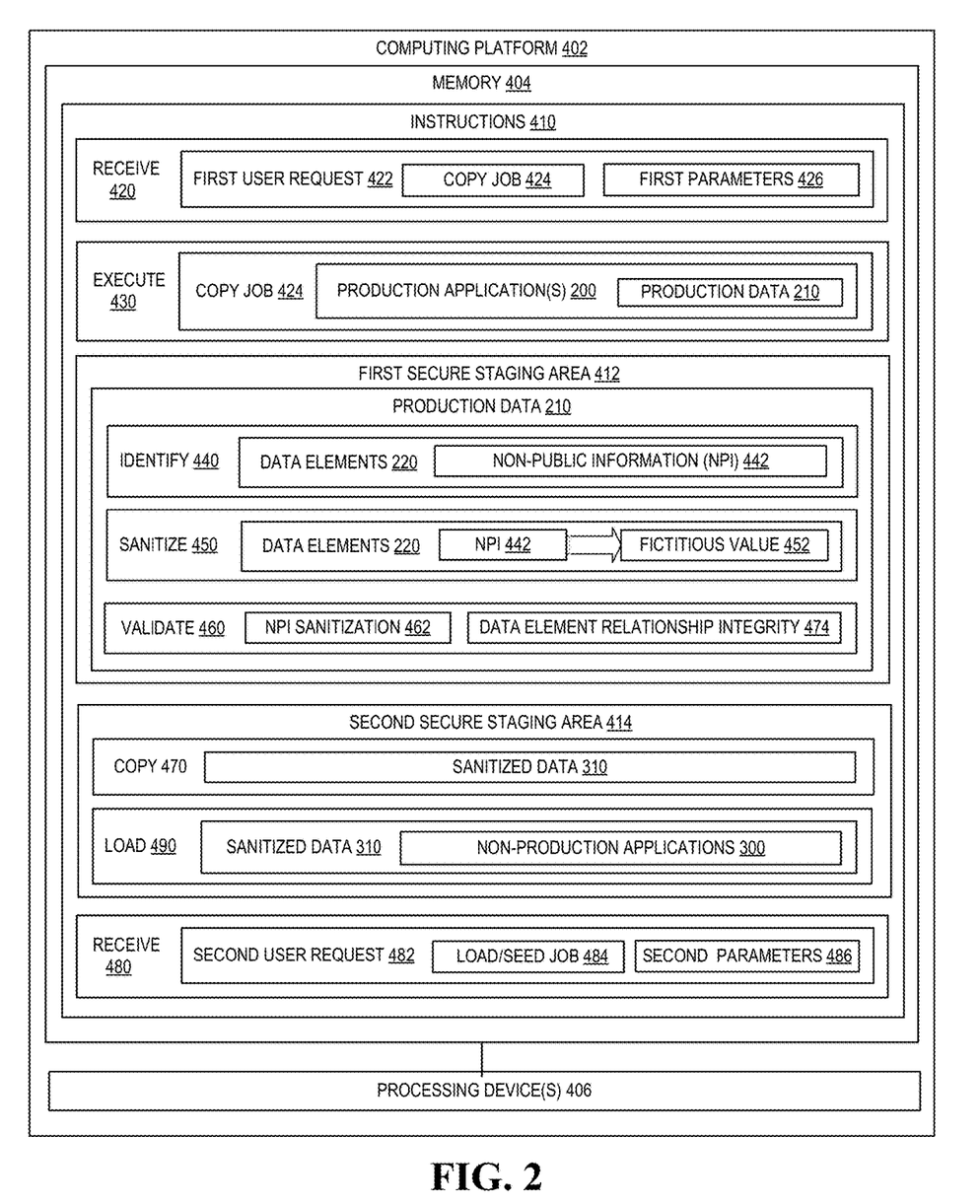
FIG. 2 is a block diagram of a computing platform of a data hub/portal configured for extracting data from production applications, sanitizing the data in a secure environment and loading the data into a testing and development environment, in accordance with some embodiments of the present disclosure.

Referring to FIG. 2 a block diagram is presented of the computing platform 402 of the data hub/portal 400 (shown in FIG. 1), in accordance with embodiments of the present invention. The computing platform 401 is disposed in the distributed communication network 110 (shown in FIG. 1) and may comprise one or more computing devices (e.g., servers, computing devices, or the like) configured to execute algorithms, modules, routines, applications, such as instructions 410. Computing platform 400 includes memory 404, which may comprise volatile and non-volatile memory, such as read-only and/or random-access memory (RAM and ROM), EPROM, EEPROM, flash cards, or any memory common to computing platforms). Moreover, memory 404 may comprise cloud storage, such as provided by a cloud storage service and/or a cloud connection service.

Further, computing platform 402 also includes at least one processing device 406, which may be an application-specific integrated circuit ("ASIC"), or other chipset, logic circuit, or other data processing device. Processing device(s) 406 may execute one or more application programming interface (APIs) (not shown in FIG. 2) that interface with any resident programs, such as instructions 410 or the like, stored in the memory 404 of the computing platform 402 and any external programs. Processing devices(s) 406 may include various processing subsystems (not shown in FIG. 2) embodied in hardware, firmware, software, and combinations thereof, that enable the functionality of the computing platform 402 and the operability of the computing platform 402 on the distributed communication network 110 (shown in FIG. 1). For example, processing subsystems allow for initiating and maintaining communications and exchanging data with other networked devices, such as devices executing production and non-production applications. For the disclosed aspects, processing subsystems of computing platform 402 may include any subsystem used in conjunction with digital hub/portal 400 and related tools, routines, sub-routines, algorithms, sub-algorithms, sub-modules thereof.

Computing platform 402 may additionally include a communications module (not shown in FIG. 2) embodied in hardware, firmware, software, and combinations thereof, that enables electronic communications between the computing platform 402 and other network devices, such as devices executing production 200 and non-production applications 300 (shown in FIG. 1). Thus, communication module may include the requisite hardware, firmware, software and/or combinations thereof for establishing and maintaining a network communication connection with one or more network devices.

Memory 404 of computing platform 402 stores instructions 410 that are executable by the processing device(s) 406. The instructions 410 are configured to receive 420 first user requests 422 that request execution of a copy job 424. The first user request 422 includes first parameters 426 that define the criteria for the data to be copied (e.g., which application(s), which data and the like) and, in specific embodiments of the invention, the occurrences of the copy job (i.e., whether the copy job is one-time only occurrence or, if the copy job is an repeated regularly scheduled occurrence, the data and/or time for the scheduled occurrence of the copy job). In specific embodiments of the invention, the request may trigger the data hub/portal to generate and initiate communication of a notification to the entity controlling the application(s) from which the data is to be copied from, asking permission for the user to have access to the application (i.e., access to copy the data for use in a non-production environment). In such embodiments of the invention, the entity controlling the application must approve the application(s) access by the user before the request is accepted and subsequent copying of the data ensues.

The instructions 410 are further configured to execute 430 the copy job 424 to (i) capture production data 210 from one or more tables or the like within the production applications 200, assemble a data set from the captured data, and (ii) copy the data set to a first secure staging area 412. In those embodiments of the invention, in which the copy 424 is set-up as an ongoing scheduled occurrence, the copy job is executed to copy the user-specified data at the date/time scheduled. The first secure staging area 412 serves as an interim environment at which processing of the data occurs.

At the first secure staging area 412, the instructions 410 are configured to identify 440 data elements 220 of the copied production data 210 that include Non-Public Information (NPI) 442. As previously discussed, the NPI may be any information that the entity in control of the data hub/portal deems to be confidential or otherwise requires exclusion for the non-production environment. The instructions 410 are further configured to sanitize 450, otherwise referred to as "scrubbing", the data elements 220 containing identifying NPI 442 by replacing the NPI 442 with fictitious values 452 (i.e., values/entries that are fake or do not otherwise indicate data/values that could be perceived to be real). In specific embodiments of the invention, instructions 410 are further configured to validate 460 the sanitized data. Validation includes validating NPI sanitization 462 (i.e., insuring that all of the NPI in the data set has been identified and removed) and data element relationship integrity 474 (i.e., insuring that all data elements in the data set, post NPI sanitization, maintain their upstream and downstream relationships with other tables, applications and the like).

In response to completion of the processing at the first secure staging area 412, the instructions 410 are configured to copy 470 the sanitized data 310 to a second secure staging area 414. In specific embodiments of the invention, the copying 470 of the sanitized data 310 to the secure staging area 414 triggers generation and initiation of communication of notification to one or more entities that indicates that the data has arrived at the second secure staging area 414 and is ready to be loaded/seeded into one or more of the plurality of non-production applications. The instructions 410 are configured to receive 480 a second user request 482 for a load/seed job 484. The second user request 482 includes second parameters 486 defining the criteria for loading the sanitized applications 310 (e.g., which of the non-production applications the data should be loaded to), as well as, the occurrences of loading the sanitized data from the second secure staging location to a plurality of the non-production applications (i.e., the load job is a one-time only occurrence or is configured to occur on regularly scheduled basis (e.g., daily, weekly or the like). In response to receiving the second user request 482, the instructions 410 are configured to load 490 the sanitized data 310 into one or more of the non-production applications 300.

In other specific embodiments of the invention, the instructions 410 are configured to maintain a copy of the sanitized data (e.g., a "gold" standard copy) at the second secure staging location after loading the sanitized data 310 to the plurality of the non-production applications 300. In this regard, in the event that the sanitized data 310 required re-loading to the non-production applications, the data hub/portal 400 does not have to execute a redundant copy job 424 to extract the production data or preform redundant sanitization of the production data.

In additional embodiments of the invention, the instructions 410 are configured to monitor progress and completion of the instructions 410 including of at least one of (i) the copy job, (ii) the identification of the non-public identification in the production data, (iii) the sanitization of the production data, and (iv) the load job. Moreover, the instructions 410 are configured to maintain a log of all of the actions performed by the data hub/portal 400 (i.e., an audit trail) and provide reporting functions that includes user-specified metric tracking and the like.

Figure 3:
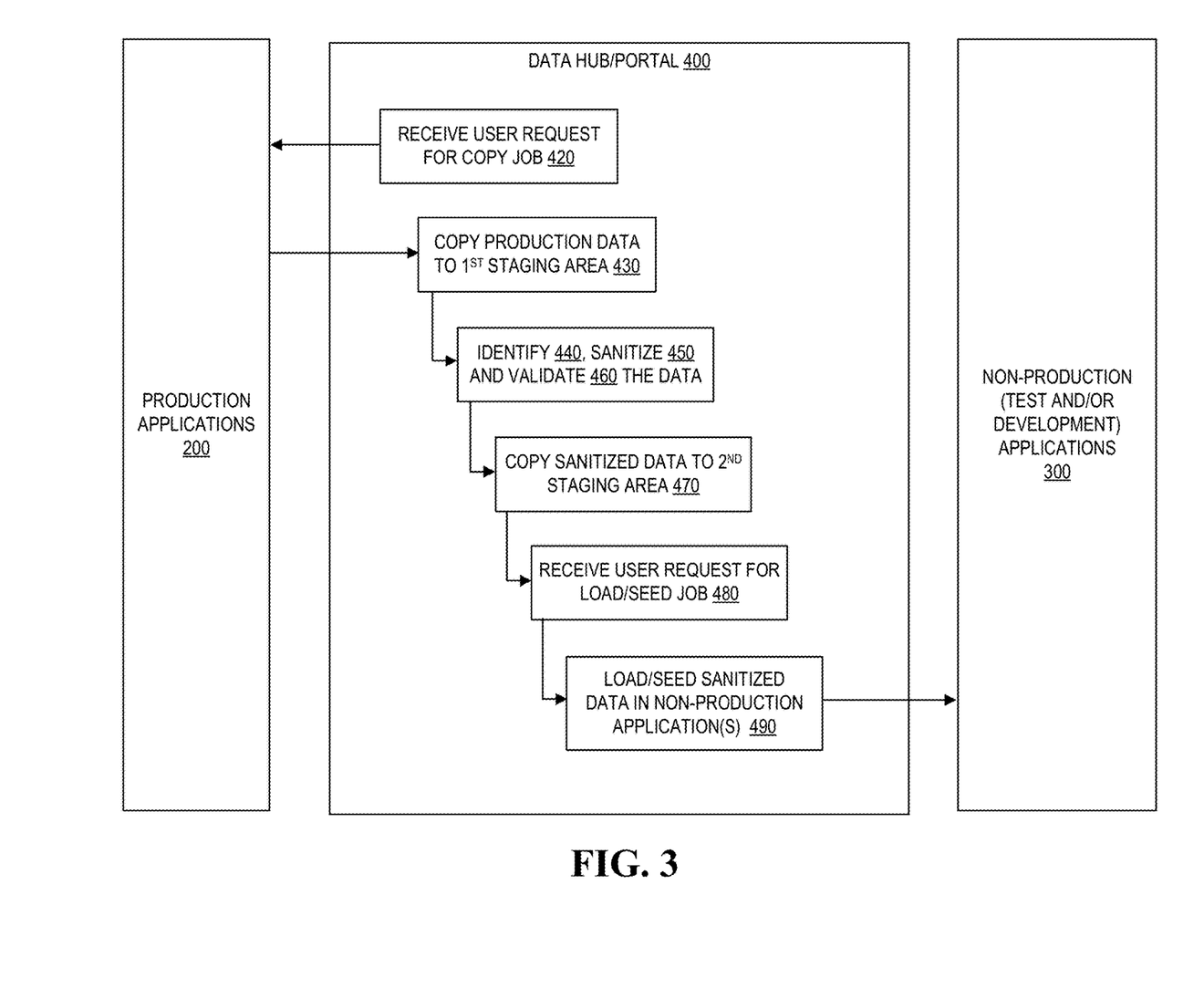
FIG. 3 is a schematic and flow diagram of a system/method extracting data from production applications, sanitizing the data in a secure environment and loading the data into a testing and development environment, in accordance with embodiment of the present invention.

Referring to FIG. 3 a schematic/flow diagram is presented of a system/method for extracting data from production applications, sanitizing the data and loading/seeding the data in non-production applications, in accordance with embodiments of the invention. The data hub/portal 400 is capable of performing the functions in an automated fashion with no manual intervention other than input of requests. The requests include the parameters associated with the copy job (e.g., what specific is requested and whether the job is a one-time occurrence or a recurring scheduled copy job). In certain embodiments of the invention, if the user has not previously been granted access to the production applications associated with the copy job, the data hub/portal 400 will generate and initiate access requests to the application owners/controllers who, in turn, approval or deny access to the applications. The request is communicated to the production applications 200, which may include a plurality of disparate applications executed on different computing platforms and/or different operating systems. The requested data may be captured in parallel from two or more production applications. Once the data has been captured, the captured data/production tables are copied 430 to a first secure staging area for secure data processing. The secure staging area of the data hub/portal insure data protection throughout the data processing stages of the hub/portal 400. The data processing includes identification 440 of the NPI in the captured data, sanitization 450 of the data by replacing the NPI with fictitious values and validation 460 of the data (i.e., insuring that all NPI has been identified and sanitized and that upstream and downstream relationships have been maintained once the data elements have been sanitized).

Once the data has been sanitized and validated, the sanitized data is copied 470 to a second secure staging area 470, which triggers loading/seeding 480 of the sanitized data into the non-production applications 300. If previous load jobs have been requested/set-up, the copying of the sanitized data to the second secure staging area will automatically cause the load/seed jobs to occur according the parameters of the scheduled load/seed jobs. In other embodiments of the invention, the copying 470 of the sanitized data to the second secure staging area triggers generation and ignition of communication of a notification to associated users that the sanitized data is located at the second secure staging area and ready for loading/seeding into the non-production applications. In such instances, a second user request is received 480 that includes the parameters that define the criteria for the load/seed jobs. In response to copying the sanitized data to the second secure staging area and/or receiving the second user request, the sanitized data is loaded/seeded 490 into the disparate non-production applications, such as testing and/or development applications, executed on different computing platforms and/or different operating systems. The loading/seeding of the sanitized data to the non-production application may occur via parallel processing (i.e., the non-production application may load the sanitized data simultaneously).

Figure 4:
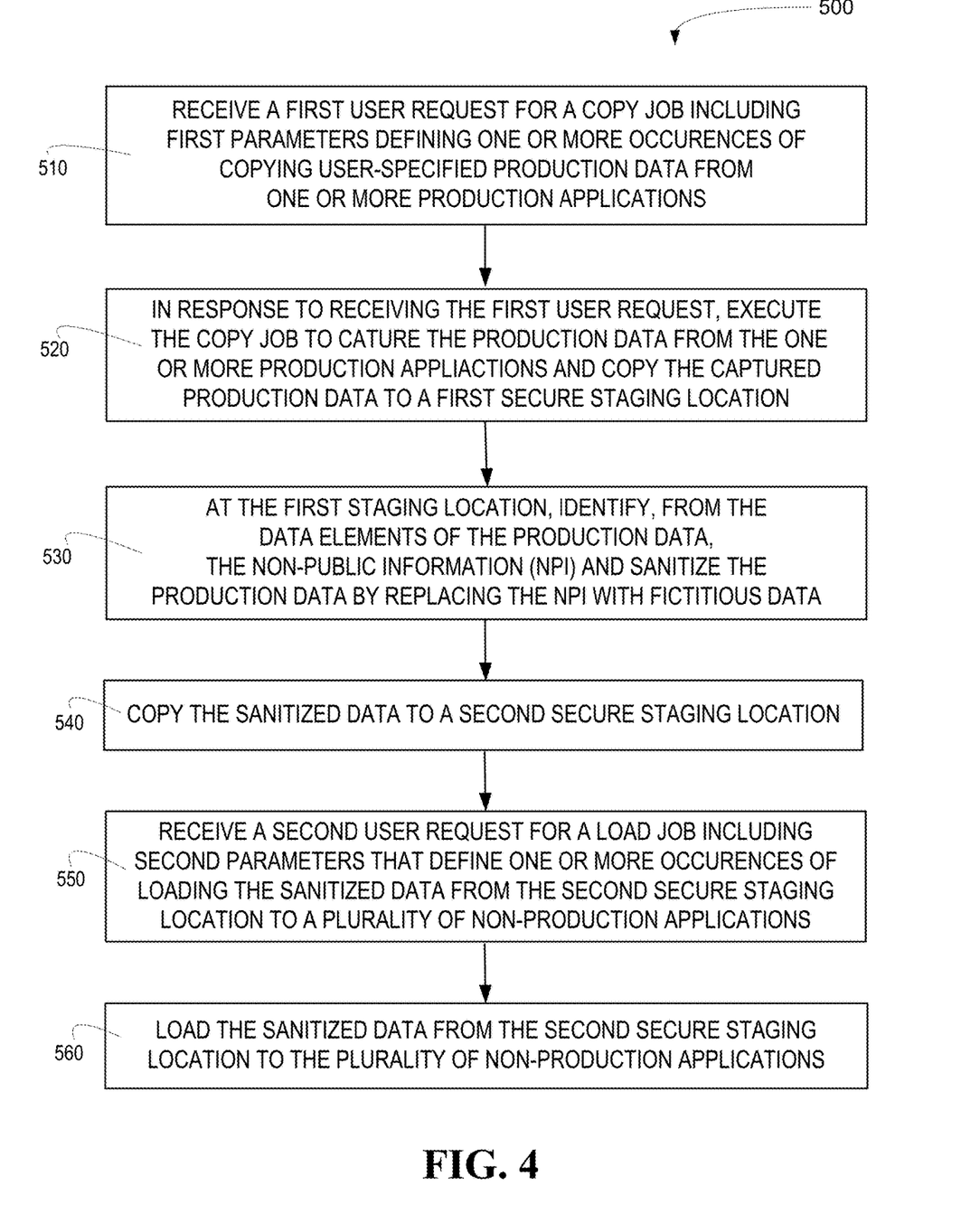
FIG. 4 is flow diagram of a method for sanitizing data within a data hub/portal, in accordance with embodiments of the present invention.

Referring to FIG. 4 a flow diagram is depicted of a method 500 for, extracting data from production applications, sanitizing the data and loading/seeding the data in non-production applications, in accordance with embodiments of the invention. At Event 510, first user requests for a copy job are received that include first parameters that define the criteria for the one or more occurrences of copying user-specified production data from one or more production applications. In specific embodiments of the invention, in which the user has not previously been granted access to the application (or each instance of a copy job warrants authorization), an access authorization request may be generated and communicated to a controlling entity, which may grant the access authorization to the user or, in some instances, deny the request.

In response to receiving the first user request, at Event 520, the copy job is executed to capture the production data from the one or more production applications and copy the captured data to a first secure staging area. The capture of the data may include identifying which of the applications contain the data. Such identification of the application may occur via parallel processing, in which multiple applications are scanned simultaneously to identify the requested data.

Once the captured data has been copied to the first secure staging area, at Event 530, the NPI is identified and sanitized from the data (i.e., NPI is removed and replaced with fictitious values). In specific embodiments of the invention, once the data has been sanitized, the data is validated to insure that all NPI has been identified and sanitized and to insure that, post data sanitization, all upstream and downstream data elements have been maintained. Once the data has been sanitized and, in some embodiments validated, at Event 540, the sanitized data is copied to a second secure staging area.

In response to receiving the sanitized data at the second secure staging area, at Event 550, the load/seed job is triggered. The load/seed job may occur according to previously configured scheduled load/seed jobs or the triggering may provide for receiving second user requests for a load/seed job. The second user requests include second parameters that define the criteria for the one or more occurrences of loading/seeding the sanitized data into one or more of the non-production applications. In specific embodiments of the invention, notifications may be generated and communicated to users that indicate that the data has been received at the second staging are and is ready for loading into the non-production applications.

At Event 560, the sanitized data is loaded/seeded from the second secure staging area to the plurality of non-production applications. The loading of the sanitized data may occur in parallel, such that multiple applications are seeded with the sanitized data simultaneously. In addition, the second secure staging area maintains a copy of the sanitized data, such that, if the non-production applications require re-loading of the data, the data can be retrieved from the second secure staging area without having to re-copy the data from the production environment and re-sanitize the data.

Thus, present embodiments of the invention provide for an online data hub/portal that extracts from production environments and loads the data into a non-production environment (e.g., testing and development environment) while sanitizing the data. The online data hub/portal allows users to extract data from a disparate production applications into a first secure staging location that triggers identification of Non-Public Information (NPI), sanitization of the identified NPI and validation of the data. Once sanitized and validated, the data hub places the data in a second secure staging location that provides for loading the sanitized data into the non-production environment.

The features, functions, and advantages that have been discussed may be achieved independently in various embodiments of the present invention or may be combined with yet other embodiments, further details of which can be seen with reference to the following description and drawings.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for extracting and sanitizing production data for testing and development environments, the system comprising:
   a plurality of production applications configured to process production data that comprises data elements including non-public information;
   a plurality of non-production applications configured for, at least one of, testing and developing prior to potential release as one of the plurality of production applications; and
   a computing platform in public network communication with the production and non-production applications and including a memory and at least one processor in communication with the memory, wherein the memory stores instructions that are executable by the at least one processor and configured to:
      receive a first user request for a copy job, wherein the first user request includes first parameters defining one or more occurrence of copying user-specified production data from at least one of the production applications,
      in response to receiving the user request, execute the copy job to capture the production data from the at least one of the production applications and copy the captured production data to a first secure staging location,
      at the first staging location:
         identify, from within the data elements of the production data, the non-public information,
         sanitize the user-specified production data by replacing the identified non-public information with fictitious information, and
         validate the sanitized production data by verifying that relationships are maintained between the sanitized data elements and second data elements disposed in tables of applications that are upstream and downstream to the at least one of the production applications,
      copy the sanitized and validated data to a second secure staging location,
      receive a second user request for a load job, wherein the second user request includes second parameters defining one or more occurrences of loading the sanitized data from the second secure staging location to a plurality of the non-production applications, and
      load the sanitized data from the second secure staging location to the plurality of the non-production applications.

2. The system of claim 1, wherein the instructions configured to validate the sanitized production data are further configured to verify that the data elements of production elements that included the non-public information have replaced the non-public information with the fictitious information.

3. The system of claim 1, wherein the instructions configured to receive the first user request for the copy job are further configured to receive the first user request for the copy job including the first parameters that define a plurality of scheduled occurrences of copying the user-specified production data from the at least one of the production applications.

4. The system of claim 3, wherein the instructions configured to execute the copy job are further configured to execute the copy job in accordance with the plurality of scheduled occurrences of copying the user-specified production data from the at least one of the production applications.

5. The system of claim 1, wherein the instructions configured to copy the sanitized data to the second secure staging location further comprise instructions configured to maintain a copy of the sanitized data at the second secure staging location after loading the sanitized data to the plurality of the non-production applications.

6. The system of claim 1, wherein the instructions are further configured to, in response to receiving the first user request, verify that a user submitting the user request has authorized access to the at least one of the production applications.

7. The system of claim 1, wherein the instructions are further configured to, in response to copying the sanitized data to the second secure staging location, communicate an electronic notification to a user that notifies the user that the sanitized data is available for requesting second copy jobs.

8. The system of claim 1, wherein the instructions are further configured to monitor progress and completion of the instructions including of at least one of (i) the copy job, (ii) the identification of the non-public identification in the production data, (iii) the sanitization of the production data, and (iv) the load job.

9. The system of claim 1, wherein the instructions are further configured to log and store actions performed by the instructions including (i) the copy job, (ii) the identification of the non-public identification in the production data, (iii) the sanitization of the production data, and (iv) the load job.

10. A computer-implemented method for extracting and sanitizing production for testing and development environments, the method implemented by one or more processing devices and including:

receiving a first user request for a copy job, wherein the first user request includes first parameters defining one or more occurrence of copying user-specified production data from at least one of the production applications;

in response to receiving the user request, executing the copy job to capture the production data from the at least one of the production applications and copy the captured production data to a first secure staging location;

at the first staging location:
identifying, from within the data elements of the production data, the non-public information;
sanitizing the production data by replacing the identified non-public information with fictitious information;
validating the sanitized production data by verifying that relationships are maintained between the sanitized data elements and second data elements disposed in tables of applications that are upstream and downstream to the at least one of the production applications;

copying the sanitized and validated data to a second secure staging location;

receiving a second user request for a load job, wherein the second user request includes second parameters defining one or more occurrences of loading the sanitized data from the second secure staging location to a plurality of the non-production applications; and loading the sanitized data from the second secure staging location to the plurality of the non-production applications.

11. The computer-implemented method of claim 10, wherein validating further comprises verifying that the data elements of production elements that included the non-public information have replaced the non-public information with the fictitious information.

12. The computer-implemented method of claim 10, wherein receiving the first user request for the copy job further comprises receiving the first user request for the copy job including the first parameters that define a plurality of scheduled occurrences of copying the user-specified production data from the at least one of the production applications, and executing the copy job further comprises executing the copy job in accordance with the plurality of scheduled occurrences of copying the user-specified production data from the at least one of the production applications.

13. The computer-implemented method of claim 10, further comprising maintaining a copy of the sanitized data at the second secure staging location after loading the sanitized data to the plurality of the non-production applications.

14. The computer-implemented method of claim 10, further comprising, in response to receiving the first user request, verifying that a user submitting the user request has authorized access to the at least one of the production applications.

15. The computer-implemented method of claim 10, further comprising, in response to copying the sanitized data to a second secure staging location, communicating an electronic notification to a user that notifies the user that the sanitized data is available for requesting second copy jobs.

16. A computer program product comprising:
a non-transitory computer-readable medium comprising:
a first set of codes for causing a computer to receive a first user request for a copy job, wherein the first user request includes first parameters defining one or more occurrence of copying user-specified production data from at least one of the production applications;

a second set of codes for causing a computer to, in response to receiving the user request, execute the copy job to capture the production data from the at least one of the production applications and copy the captured production data to a first secure staging location;

a third set of codes for causing a computer at the first secure staging location, to (i) identify, from within the data elements of the production data, the non-public information, (ii) sanitize the production data by replacing the identified non-public information with fictitious information, and (iii) validate the sanitized production data by verifying that relationships are maintained between the sanitized data elements and second data elements disposed in tables of applications that are upstream and downstream to the at least one of the production applications;

a fourth set of codes for causing a computer to copy the sanitized and validated data to a second secure staging location;

a fifth set of codes for causing a computer to receive a second user request for a load job, wherein the second user request includes second parameters defining one or more occurrences of loading the sanitized data from the second secure staging location to a plurality of the non-production applications; and a sixth set of codes for causing a computer to load the sanitized data from the second secure staging location to the plurality of the non-production applications.

17. The computer program product of claim 16, wherein the third set of codes are further configured for causing the computer to validate the sanitized production data by verifying that the data elements of production elements that included the non-public information have replaced the non-public information with the fictitious information.

18. The computer program product of claim 16, the first set of codes is further causes the computer to receive the first user request for the copy job including the first parameters that define a plurality of scheduled occurrences of copying the user-specified production data from the at least one of the production applications, and the second set of codes further causes the computer to execute the copy job in accordance with the plurality of scheduled occurrences of copying the user-specified production data from the at least one of the production applications.

19. The computer program product of claim 16, further comprising a seventh set of codes for causing a computer to maintain a copy of the sanitized data at the second secure staging location after loading the sanitized data to the plurality of the non-production applications.

* * * * *